US008818791B2

(12) United States Patent
Xiao et al.

(10) Patent No.: US 8,818,791 B2
(45) Date of Patent: Aug. 26, 2014

(54) TECHNIQUES FOR ASSISTING A USER IN THE TEXTUAL INPUT OF NAMES OF ENTITIES TO A USER DEVICE IN MULTIPLE DIFFERENT LANGUAGES

(75) Inventors: Xiangye Xiao, Beijing (CN); Fan Yang, Beijing (CN); Hanping Feng, Beijing (CN); Shijun Tian, Beijing (CN); Yuanbo Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 290 days.

(21) Appl. No.: 13/459,926

(22) Filed: Apr. 30, 2012

(65) Prior Publication Data

US 2013/0289973 A1    Oct. 31, 2013

(51) Int. Cl.
    *G06F 17/28* (2006.01)
(52) U.S. Cl.
    USPC ........................................ 704/3; 704/2; 704/8
(58) Field of Classification Search
    CPC .. G06F 17/2223; G06F 17/2863; G06F 3/018
    USPC .......................................................... 704/2–8
    See application file for complete search history.

(56) References Cited

U.S. PATENT DOCUMENTS

| 7,149,970 | B1 | 12/2006 | Pratley et al. | |
|---|---|---|---|---|
| 7,546,529 | B2 | 6/2009 | Reynar et al. | |
| 8,275,601 | B2 * | 9/2012 | Wang et al. | 704/2 |
| 2005/0131686 | A1 | 6/2005 | Yamamoto et al. | |
| 2005/0222838 | A1 * | 10/2005 | Gong | 704/5 |
| 2007/0021956 | A1 * | 1/2007 | Qu et al. | 704/8 |
| 2009/0319257 | A1 * | 12/2009 | Blume et al. | 704/7 |
| 2010/0169770 | A1 | 7/2010 | Hong et al. | |
| 2010/0312545 | A1 * | 12/2010 | Sites | 704/8 |
| 2011/0137636 | A1 * | 6/2011 | Srihari et al. | 704/2 |
| 2012/0029902 | A1 * | 2/2012 | Lu et al. | 704/2 |
| 2012/0203541 | A1 * | 8/2012 | Liu et al. | 704/8 |
| 2012/0259614 | A1 * | 10/2012 | De Bruyn et al. | 704/3 |
| 2012/0290287 | A1 * | 11/2012 | Fux et al. | 704/8 |
| 2013/0151234 | A1 * | 6/2013 | Huang et al. | 704/8 |

FOREIGN PATENT DOCUMENTS

| JP | 56418872 | A | 1/1989 |
|---|---|---|---|
| JP | 2005182208 | A | 7/2005 |
| JP | 2010073177 | A | 4/2010 |
| WO | 2006055120 | A2 | 5/2006 |
| WO | 2011050501 | A1 | 5/2011 |

\* cited by examiner

*Primary Examiner* — Douglas Godbold
(74) *Attorney, Agent, or Firm* — Remarck Law Group PLC

(57) ABSTRACT

A computer-implemented technique includes receiving a first input from a user at a user device, the first input including a first word of a first alphabet-based language, which is a transliteration of a non-alphabet-based language, which is one of a logogram-based language and a syllabogram-based language. The technique then compares the first words to pluralities of potential translated words from one or more datastores associated with a second alphabet-based language and the logogram-based or syllabogram-based languages. The technique may then generate a probability score for each of the pluralities of potential translated words, the probability score indicating a likelihood of an appropriate translation. The techniques may then provide the user with some or all of the pluralities of potential translated words and the user may select an appropriate translated word to obtain a selected word, which may then be displayed via a display of the user device.

20 Claims, 6 Drawing Sheets

TECHNIQUES FOR ASSISTING A USER IN THE TEXTUAL INPUT OF NAMES OF ENTITIES TO A USER DEVICE IN MULTIPLE DIFFERENT LANGUAGES

FIELD

The present disclosure relates to textual input to computing devices and, more particularly, to techniques for assisting a user in the textual input of names of entities to a user device in multiple different languages.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "user device" generally refers to a computing device having a user interface, a display, and a processor. For example, the user device may be a desktop computer. User devices also may include mobile devices such as mobile phones, tablet computers, and the like. User devices may selectively connect to a network such as the Internet and/or a mobile telephone network. A user may input information, e.g., text, to the user device via a user interface such as a keyboard. Due to size constraints, however, many user devices may include a partial QWERTY-based physical keyboard. Additionally or alternatively, user devices may include touch displays, e.g., capacitive sensing displays, which both display information to the user and receive input from the user. For example, these user devices may display a character layout to the user similar to the partial QWERTY-based keyboard.

SUMMARY

A computer-implemented technique is presented. The technique includes receiving, via a user interface of a user device further including a display, and a processor, a first input from a user of the user device, the first input including a Pinyin word, the Pinyin word representing a name of an entity. The technique includes comparing, at the user device, the Pinyin word to a plurality of Chinese words from a first datastore, the plurality of Chinese words being potential translations of the Pinyin word, each of the plurality of Chinese words including one or more Chinese characters. The technique includes comparing, at the user device, the Pinyin word to a plurality of English words from a second datastore, the plurality of English words being potential translations of the Pinyin word. The technique includes generating, at the user device, a probability score for each of the plurality of Chinese words and the plurality of English words based on the respective comparisons to the Pinyin word, each probability score indicating a likelihood that a corresponding one of the plurality of Chinese words and the plurality of English words is an appropriate translation of the Pinyin word. The technique includes providing, via the display of the user device, a plurality of translated words to the user, the plurality of translated words having the highest probability scores and including at least one of the plurality of Chinese words and at least one of the plurality of English words. The technique includes receiving, via the user interface of the user device, a selection of one of the plurality of translated words by the user to obtain a selected word. The technique also includes displaying, via the display of the user device, the selected word.

Another computer-implemented technique is also presented. The technique includes receiving, via a user interface of a user device further including a display, and a processor, a first input from a user of the user device, the first input including a first word of a first alphabet-based language, the first alphabet-based language being a transliteration of a non-alphabet-based language, the non-alphabet-based language being one of a logogram-based language and a syllabogram-based language. The technique includes comparing, at the user device, the first word to a plurality of second words from a first datastore, the plurality of second words being of the non-alphabet-based language, the plurality of second words being potential translations of the first word. The technique includes comparing, at the user device, the first word to a plurality of third words from a second datastore, the plurality of third words being of a second alphabet-based language, the second alphabet-based language being different than the first alphabet-based language, the third plurality of words being potential translations of the first word. The technique includes generating, at the user device, a probability score for each of the plurality of second words and the plurality of third words based on the respective comparisons to the first word using a language model, each probability score indicating a likelihood that one of the plurality of second words and the plurality of third words is an appropriate translation of the first word. The technique includes providing, via the display of the user device, a plurality of translated words to the user, the plurality of translated words based on the plurality of second words, the plurality of third words, and the probability scores. The technique includes receiving, via the user interface of the user device, second input from the user, the second input indicating a selection of one of the plurality of translated words to obtain a selected word. The technique also includes displaying, via the display of the user device, the selected word.

A system is also presented. The system includes an input control module that receives, via a user interface of a user device further including a display, and a processor, a first input from a user of the user device, the first input including a first word of a first alphabet-based language, the first alphabet-based language being a transliteration of a non-alphabet-based language, the non-alphabet-based language being one of a logogram-based language and a syllabogram-based language. The system includes a comparison module that (i) compares, at the user device, the first word to a plurality of second words from a first datastore, the plurality of second words being of the non-alphabet-based language, the plurality of second words being potential translations of the first word, and (ii) compares, at the user device, the first word to a plurality of third words from a second datastore, the plurality of third words being of a second alphabet-based language, the second alphabet-based language being different than the first alphabet-based language, the third plurality of words being potential translations of the first word. The system also includes a scoring module that generates, at the user device, a probability score for each of the plurality of second words and the plurality of third words based on the respective comparisons to the first word using a language model, each probability score indicating a likelihood that one of the plurality of second words and the plurality of third words is an appropriate translation of the first word. The input control module also (i) provides, via the display of the user device, a plurality of translated words to the user, the plurality of translated words based on the plurality of second words, the plurality of third words, and the probability scores, (ii) receives, via the user interface of the user device, second input from the user, the second input indicating a selection of one of the plurality of translated words to obtain a selected word, and (iii) displays, via the display of the user device, the selected word.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
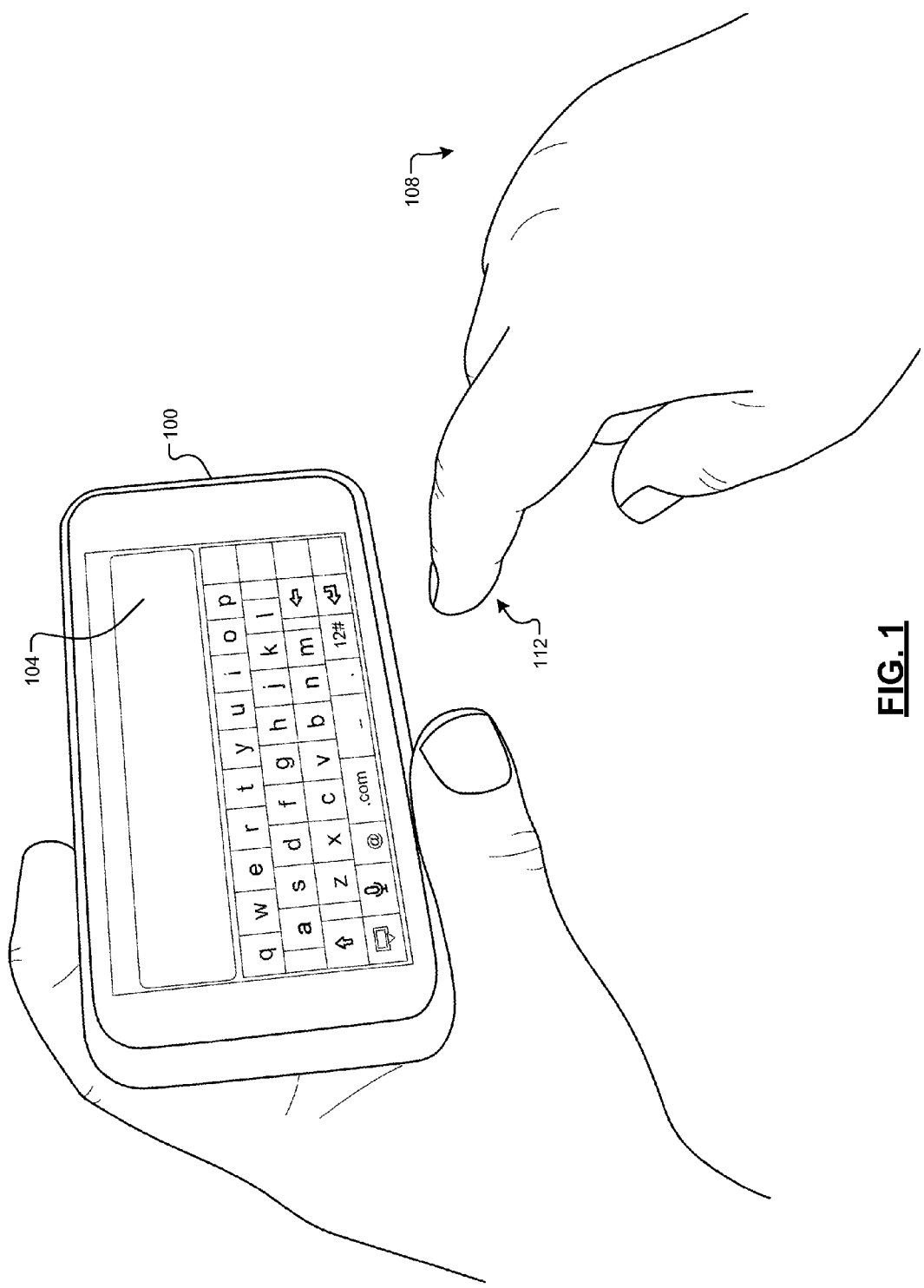
FIG. 1 illustrates a user interacting with an example user device according to some implementations of the present disclosure.

Referring now to FIG. 1, an example user device 100 is shown. As shown, the user device 100 may be a mobile device such as a mobile phone, a tablet computer, or the like. The user device 100, however, may also be a non-portable computing device such as a desktop computer or the like. The user device 100 generally includes a display 104. For example, the display 104 may be a touch display as shown, such as a capacitive sensing display. As previously described, the user device 100 may additionally or alternatively include a physical partial QWERTY-based keyboard (not shown). For purposes of simplicity, however, the touch display 104 and user touch input are the display and user input technique referred to herein, respectively. The touch display 104 may display information to a user 108 and receive input from the user 108. For example, the user 108 may input information to the user device 100 via the touch display 104 using one or more fingers 112.

User devices, such as the user device 100 of FIG. 1, are widely available and thus may be used in many different countries throughout the world. Therefore, user devices may be configured to display information to and/or receive information from a user in a variety of different languages. Input method editors, or IMEs, are software applications that allow a user to input a specific language to a user device. For example, IMEs may provide for the user to input various Latin/English alphabet-based languages. There are many other languages, however, that are based on other characters or symbols. These languages may be characterized as syllabogram-based and logogram-based languages.

One widely used logogram-based language is Chinese, which includes thousands of unique characters. For example, Pinyin is an English alphabet-based transliteration of Chinese. Transliteration refers to the process of converting one script to another, e.g., converting Chinese characters to English alphabet-based letters. In other words, Pinyin provides a system for English alphabet-based representations of Chinese characters. For example only, "ni hao" is the Pinyin representation of "您 好," which means "hello" in English. Therefore, one IME for mobile devices may be a Pinyin-based IME for providing input of Chinese characters for text messaging, e-mailing, and the like.

In some instances, however, a user may need to input a name of an entity in a language, e.g., English, which is foreign to the user, e.g., a Chinese user. An entity may be an organization, a name of a person or a place, a character in a game, or the like. Names of entities may be more difficult to translate, and therefore many translations may be incorrect. Moreover, typical IMEs do not allow a user to input a transliteration of a syllabogram-based language, e.g., Japanese, or a logogram-based language, e.g., Chinese, to obtain a list of candidates in both the syllabogram-based or logogram-based language as well as another alphabet-based language, e.g., English. For example only, an IME may require the Chinese user to input the Pinyin transliteration in order to first select a correct Chinese representation of the name of the entity, which may then be translated to English.

Accordingly, techniques are presented for assisting a user in the textual input of names of entities to a user device in multiple different languages. While the techniques are generally described in the context of a mobile device, the techniques may be applied to any suitable user device. The techniques generally provide faster user input of names of entities to a user device in multiple different languages. The techniques receive first input from a user of a user device including a user interface, a display, and a processor. The first input includes a first word of a first alphabet-based language. The first alphabet-based language is a transliteration of a non-alphabet-based language. The non-alphabet-based language is one of a syllabogram-based language and a logogram-based language. For example, the first alphabet-based language may be Pinyin and the non-alphabet-based language may be Chinese.

The techniques then perform two different comparisons. The techniques compare the first word to a plurality of second words from a first datastore, the plurality of second words being of the non-alphabet-based language. The plurality of second words includes potential translations of the first word. The techniques also compare the first word to a plurality of third words from a second datastore, the plurality of third words being of a second alphabet-based language. The plurality of third words also includes potential translations of the first word. For example, the second alphabet-based language may be English. The techniques then generate a probability score for each of the plurality of second words and the plurality of third words based on the respective comparisons, each probability score indicating a likelihood that a corresponding one of the plurality of second words and the plurality of third words is an approved translation of the first word. The techniques then provide a plurality of translated words to the user via the display of the user device, the plurality of translated words being based on the plurality of second words, the plurality of third words, and the probability scores.

In other words, the plurality of translated words may be a subset of the plurality of second words and the plurality of third words. The plurality of translated words may include at least one of the plurality of second words and at least one of the plurality of third words. For example, the plurality of translated words may include a subset of the plurality of second words and the plurality of third words. The subset includes words having higher corresponding probability scores than other words in the plurality of second words and the plurality of third words. In some implementations, the plurality of first words and the plurality of second words may be ranked according to their corresponding probability scores to generate a ranked plurality of translated words, from which the plurality of translated words may then be chosen. The techniques receive second input from the user via the user device, the second input indicating a selection of one of the plurality of translated words to obtain a selected translated word. The techniques then provide the selected translated word to the user via the display of the user device.

Figure 2:
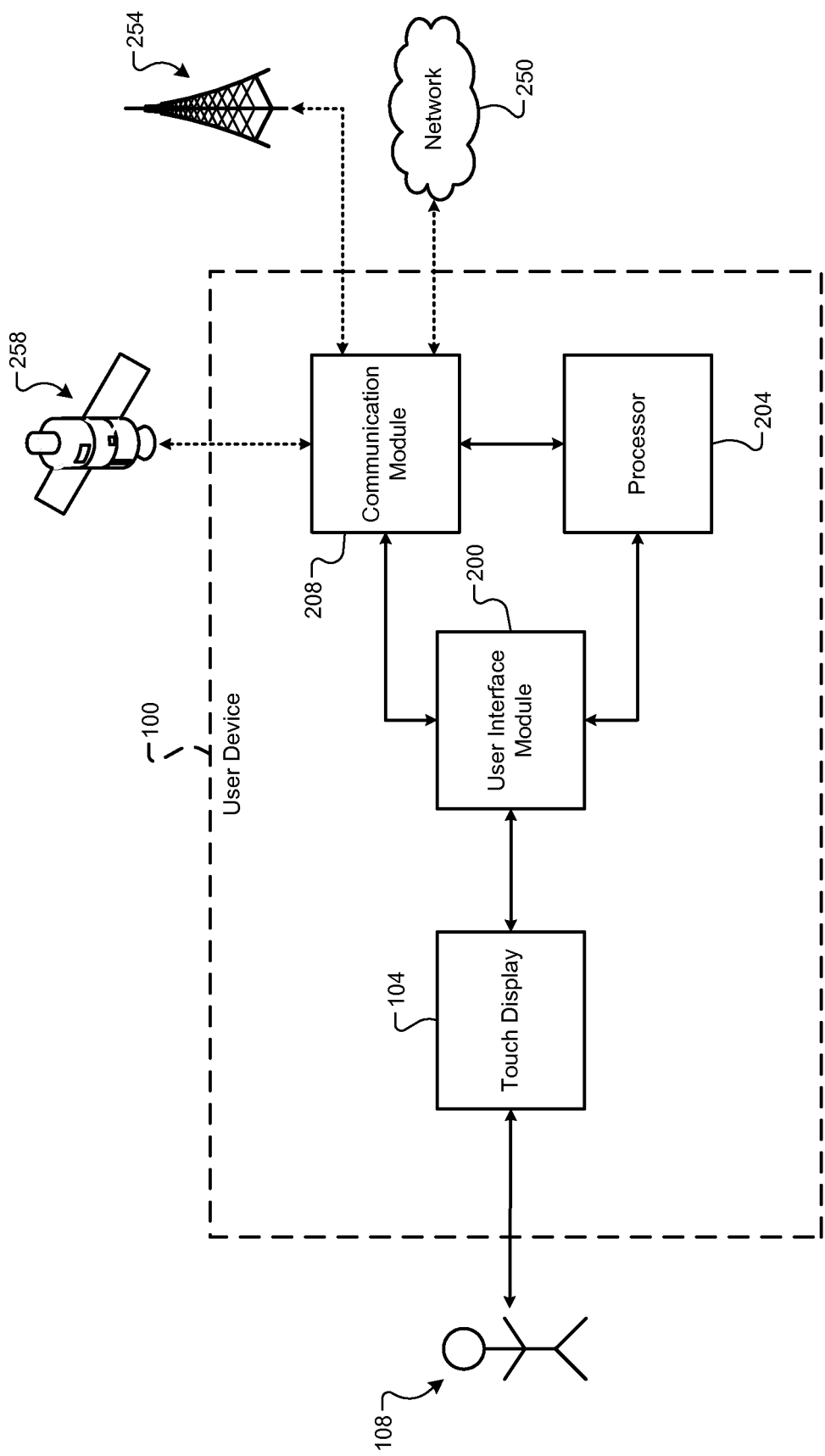
FIG. 2 is a functional block diagram of the user device of FIG. 1 according to some implementations of the present disclosure.

Referring now to FIG. 2, an example of the user device 100 is shown. As previously described, the user device 100 includes the touch display 104. For example, the touch display 104 may be a capacitive sensing display. The touch display 104 displays information to the user 108 and receives information input by the user 108. As previously described, the user device 100 may additionally or alternatively include a physical character layout, e.g., a partial QWERTY-based keyboard, for receiving input from the user 108. The user device 100 may further include a user interface module 200, a processor 204, and a communication module 208. It will be appreciated that the user device 100 may include additional computing components, such as memory and the like.

The user interface module 200 controls communication with the user 108 via the touch display 104 of the user device 100. The user interface module 200 may provide the user 108 with various different character input configurations via the touch display 104 of the user device 100. For example, the user interface module 200 may provide the user 108 with a form of the standard QWERTY keyboard via the touch display 104 of the user device 100. Alternatively, the user interface module 200 may provide the user 108 with a standard 12-key configuration, also known as a T9-input based character configuration.

The user interface module 200 may also receive input from the user 108, e.g., via the provided character input configuration. The user interface module 200, however, may also include various IMEs, e.g., a Pinyin to Chinese and English IME, which allow the user 108 to input characters in different languages. The user interface module 200, therefore, may also convert the input received from the user 108 to one or more desired languages, e.g., Chinese and English, by translating the user input, e.g., Pinyin. For example, the user interface module 200 may use a language model in conjunction with a plurality of language datastores when translating the user input (described in detail later).

The processor 204 controls most operations of the user device 100. The processor 204, therefore, may communicate with both the user interface module 200 and the communication module 208. For example, the processor 204 may perform tasks such as, but not limited to, loading/controlling the operating system of the user device 100, loading/configuring communication parameters for the communication module 208, controlling IME parameters of the user interface module 200, and controlling memory storage/retrieval operations, e.g., for loading of the various parameters.

The communication module 208 controls communication between the user device 100 and other devices. For example only, the communication module 208 may provide for communication between the user device 100 and other users associated with the user 108 and/or the Internet. The user device 100 may typically communicate via one or more of three communication mediums: a computing network 250, e.g., the Internet (hereinafter "the network 250"), a mobile telephone network 254, and a satellite network 258. Other communication mediums may also be implemented. For example, the communication module 208 may be configured for both wired and wireless network connections, e.g., radio frequency (RF) communication.

Figure 3:
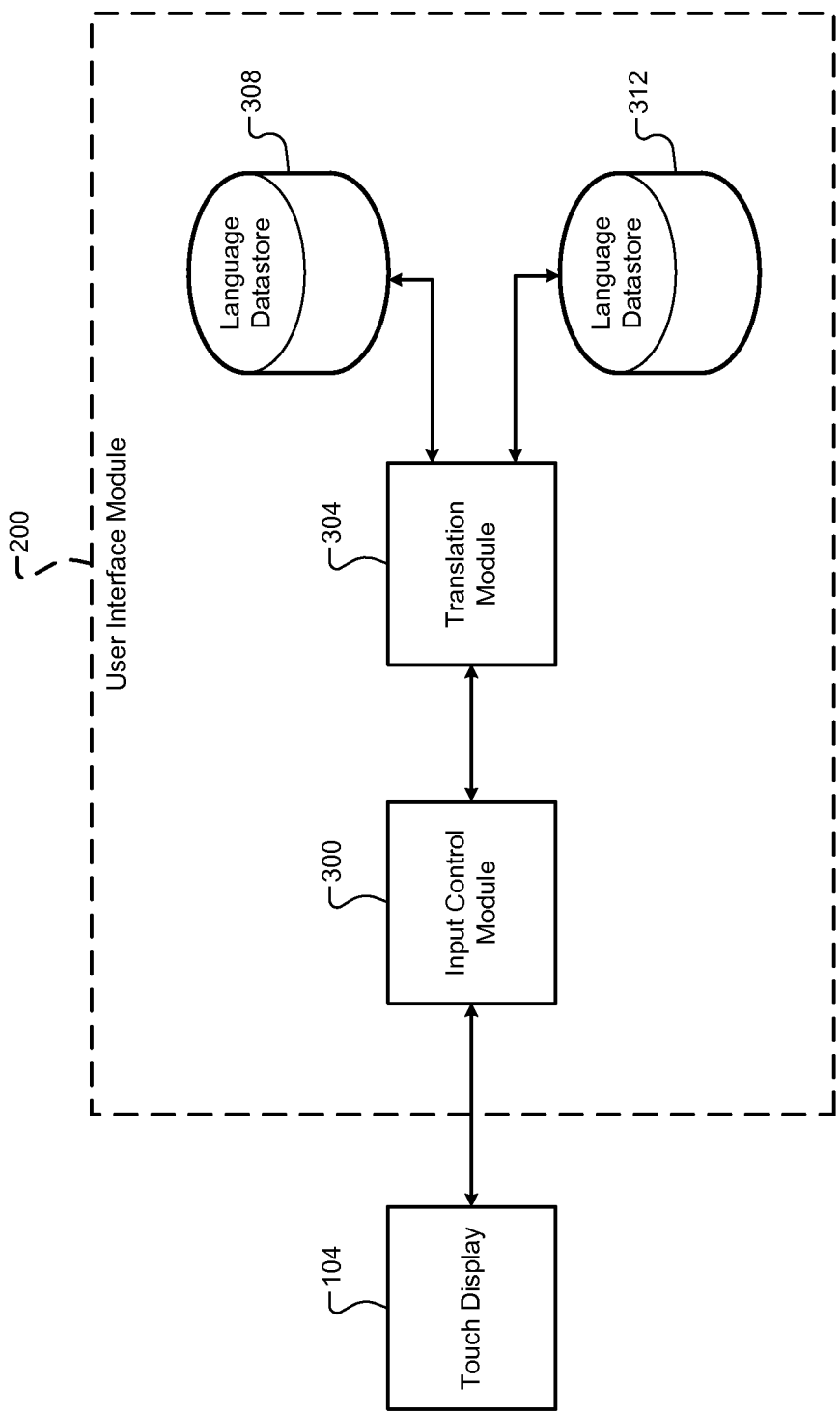
FIG. 3 is a functional block diagram of an example of a user interface module of the user device of FIG. 1 according to some implementations of the present disclosure.

Referring now to FIG. 3, an example of the user interface module 200 is shown. The user interface module 200 may include an input control module 300, a translation module 304, a first language datastore 308, and a second language datastore 312. While two modules and two datastores are shown and described herein, the user interface module 200 may include other suitable computing components such as additional datastores, other memory, and the like. Alternatively, first and/or second language datastores 308, 312 may be portions of one physical datastore or memory.

The input control module 300 receives first input from the user 108 via the touch display 104 of the user device 100. The first input includes a first word of a first alphabet-based language. For example, the first alphabet-based language may be Pinyin. The first alphabet-based language is also transliteration of a non-alphabet-based language. The first word may represent a name of an entity, such as an organization, a person, a place, or the like. The non-alphabet-based language may be a syllabogram-based language or a logogram-based language. For example, the non-alphabet-based language may be Chinese (a logogram-based language). The input control module 300 may also control whether (and which) translations of the first input are provided to the user 108 for selection via the touch display 104 of the user device 100.

More specifically, the input control module 300 (in conjunction with the translation module 304) may provide the user 108 with a plurality of translated words via the touch display 104 of the user device 100, the plurality of translated words representing various translations of the first word. The input control module 300 may then receive second input from the user 108 via the touch display 104 of the user device 100. The second input indicates a selection of one of the plurality of translated words to obtain a selected translated word. The input control module 300 may then provide the selected translated word to the user 108 via the touch display 104 of the user device 100. For example, the selected translated word may replace the first word. The selected translated word may also be provided to the processor 204 for processing and/or to the communication module 208 for transmission, e.g., text messaging or e-mail.

The translation module 304 receives the first input from the input control module 300. The translation module 304 compares the first word to each of a plurality of second words and a plurality of third words. The plurality of second words is from the non-alphabet-based language and includes potential translations of the first word. The plurality of third words is from a second alphabet-based language and also includes potential translations of the first word. For example, the second alphabet-based language may be English. Based on the respective comparisons, the translation module 304 may generate a probability score for each of the plurality of second words and the plurality of third words. The translation module 304 may then generate the plurality of translated words based on the plurality of second words, the plurality of third words, and their corresponding probability scores.

The first language datastore 308 may store a lexicon of symbols or characters in the non-alphabet-based language. The plurality of second words, therefore, may be retrieved by the translation module 304 from the first language datastore 308 using a language model. Alternatively, the plurality of second words may include each word stored in the first language datastore 308. Similarly, the second language datastore 312 may store a lexicon of words in the second alphabet-based language. The plurality of third words, therefore, may be retrieved by the translation module 304 from the second language datastore 312 using a language model. Alternatively, the plurality of third words may include each word stored in the second language datastore 312.

In other words, in the case of the plurality of second or third words including each word in the first and/or second language datastores 308, 312, respectively, the entire first and/or second language datastores 308, 312 may be scored using a language model. Moreover, while two pluralities of words (the pluralities of second words and third words) and two language datastores are shown and described herein, other numbers of pluralities of words and/or language datastores may be implemented. In addition, while Pinyin to Chinese and English translation is described herein, other languages may be implemented.

Figure 4:
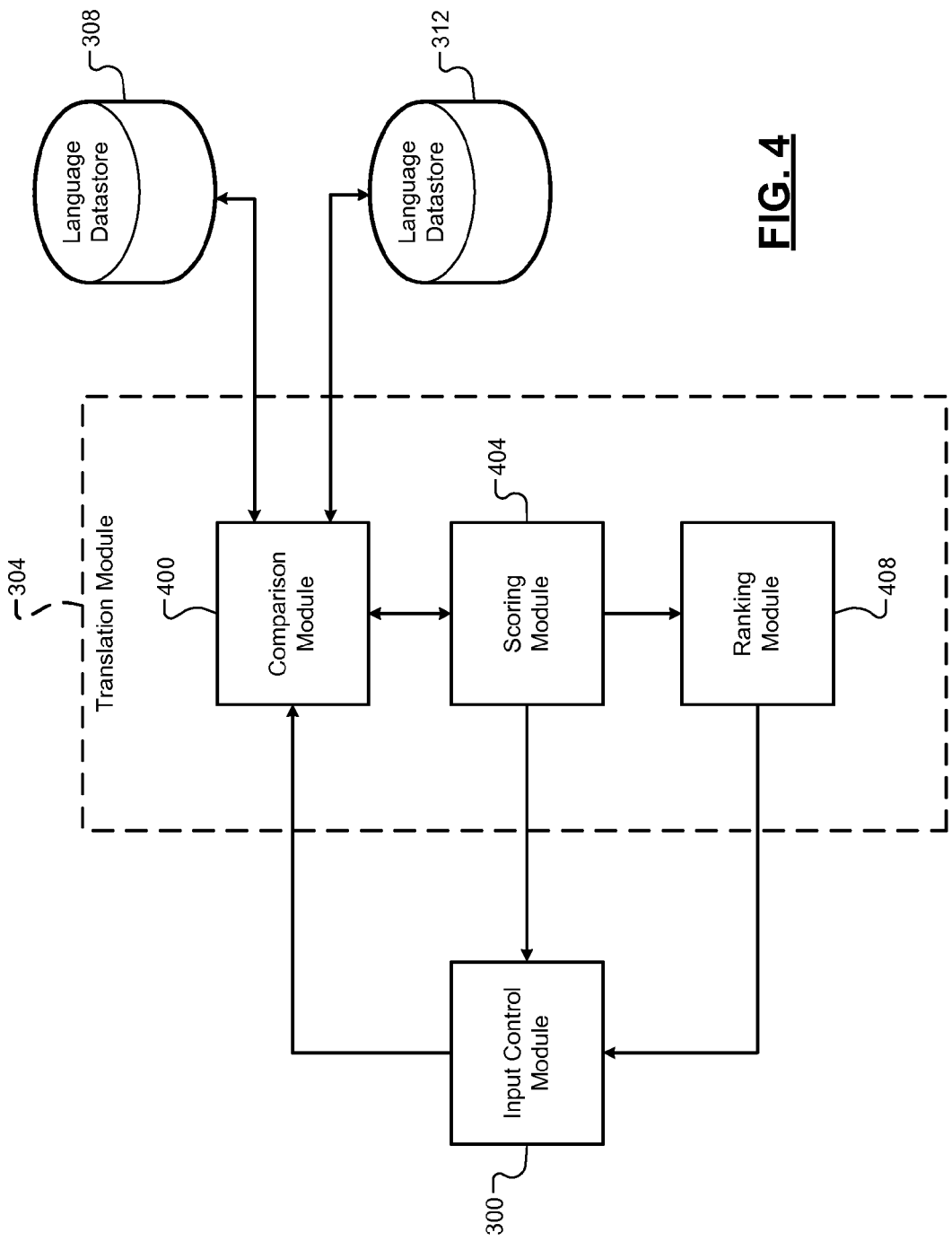
FIG. 4 is a functional block diagram of a translation module of the user interface module of FIG. 3 according to some implementations of the present disclosure.

Referring now to FIG. 4, an example of the translation module 304 is shown. The translation module 304 may include a comparison module 400, a scoring module 404, and a ranking module 408. While these three modules are shown and described below, the translation module 304 may further include other suitable computing components such as memory and the like.

The comparison module 400 first compares the first word to the plurality of second words from the first language datastore 308. As previously described, the plurality of second words may include each word in the first language datastore 308. Alternatively, the plurality of second words may be retrieved from the first language datastore 308 using a language model, the plurality of second words thereby indicating a subset of the entire first language datastore 308 having words that are more likely the approved translation of the first word. The comparison module 400 may then compare the first word to the plurality of third words from the second language datastore 312. Similar to above, the plurality of third words may include each word from the second language datastore 312 or may be retrieved from the second language datastore 312 using a language model.

The scoring module 404 receives the first word, the plurality of second words, and the plurality of third words. The scoring module 404 generates a probability score for each of the plurality of second words and the plurality of third words using a language model. For example, the language model may be different than the language model used to retrieve the plurality of second words and/or the plurality of third words. In addition, this other language model may be more complex. Each probability score indicates a likelihood that a corresponding one of the plurality of second words and the plurality of third words is an approved translation of the first word. The probability scores may be output to the input control module 300 and/or output to the ranking module 408 (see below).

The ranking module 408 may receive the plurality of second words, the plurality of third words, and their corresponding probability scores from the scoring module 404. The ranking module 408 ranks the plurality of second words and the plurality of third words based on their corresponding probability scores. For example, the ranking module 408 may rank the plurality of second words and the plurality of third words from a highest probability score to a lowest probability score. The ranking module 408 may then generate the plurality of translated words for the input control module 300 to provide to the user 108. As previously described, the plurality of translated words may be a subset of the plurality of second words and the plurality of third words.

In some embodiments, the ranking module 408 may provide only a predetermined number of translated words. In other words, the plurality of translated words may have a predetermined maximum number of words. For example, this predetermined number of translated words may be a number of words selected by the user, e.g., a parameter input to the user device 100. Additionally, the predetermined number of translated words may be based on a configuration of user device 100, e.g., the size of the touch display 104. For example, the predetermined number of translated words may be smaller for a mobile device in comparison to the predetermined number of words for a desktop computer.

For example only, the user 108 may desire to input the word "Zurich" while traveling in Germany. The user 108, however, may only know the Pinyin representation of Zurich: "Sulishi". The user 108, therefore, may input the first word "Sulishi" to the user device 100. After comparison by the comparison module 400, scoring by the scoring module 404, and ranking by the ranking module 408, the user 108 may be provided with the following plurality of translated words:

1. 苏黎世 2. Zürich 3. Zurich 4. 闲立 which stand for Zurich (translated), Zürich, Zurich, and "Stood", respectively.

Additionally, for example only, the user 108 may desire to input the word "Elizabeth" for communication with an English friend. The user 108, however, may only know the Pinyin representation of Elizabeth: "Vilishabai". The user 108, therefore, may input the first word "Vilishabai" to the user device 100. After comparison by the comparison module 400, scoring by the scoring module 404, and ranking by the ranking module 408, the user 108 may be provided with the following plurality of translated words:

1. 伊丽莎白 2. Elizabeth 3. 一粒沙 which stand for Elizabeth (translated), Elizabeth, and "A sand", respectively.

Additionally or alternatively, for example only, in some implementations the user 108 may input English to obtain both a Pinyin representation and a Chinese translation. For example, this technique may be useful when the user 108 can see or read a name of an entity, but does not know the Pinyin representation in order to obtain the Chinese translation. For example only, the user 108 may see or read "Zurich" while traveling in Germany, but may not know the Pinyin representation of "Zurich" in order to obtain the Chinese translation. The user 108 may input the first word "Zurich" to the user device 100. After comparison by the comparison module 400, scoring by the scoring module 404, and ranking by the ranking module 408, the user 108 may be provided with the following plurality of translated words:

1. 苏黎世 2. 纠日常 3. 阻日成 4. 组 which represent Zurich (translated), "Group daily", "Resistance Ri-Cheng", and "Group", respectively.

Additionally, for example only, the user 108 may see or read "London" while traveling in England, but may not know the Pinyin representation of "London" in order to obtain the Chinese translation. The user 108 may input the first word "London" to the user device 100. After comparison by the comparison module 400, scoring by the scoring module 404, and ranking by the ranking module 408, the user 108 may be provided with the following plurality of translated words:

1. 伦敦 2. 咯难得哦你 3. 咯 which represent London (translated), "Oh you slightly rare", and "Slightly", respectively.

Lastly, for example only, the user 108 may see or read the name "Smith", but may not know the Pinyin representation of "Smith" in order to obtain the Chinese translation. The user 108 may input the first word "Smith" to the user device 100. After comparison by the comparison module 400, scoring by the scoring module 404, and ranking by the ranking module 408, the user 108 may be provided with the following plurality of translated words:

1. 史密斯 2. 施密特和 3. 水蜜桃 4. 施密特 which represent Smith (translated), "Schmidt and", "Peach", and "Schmidt", respectively.

Figure 5:
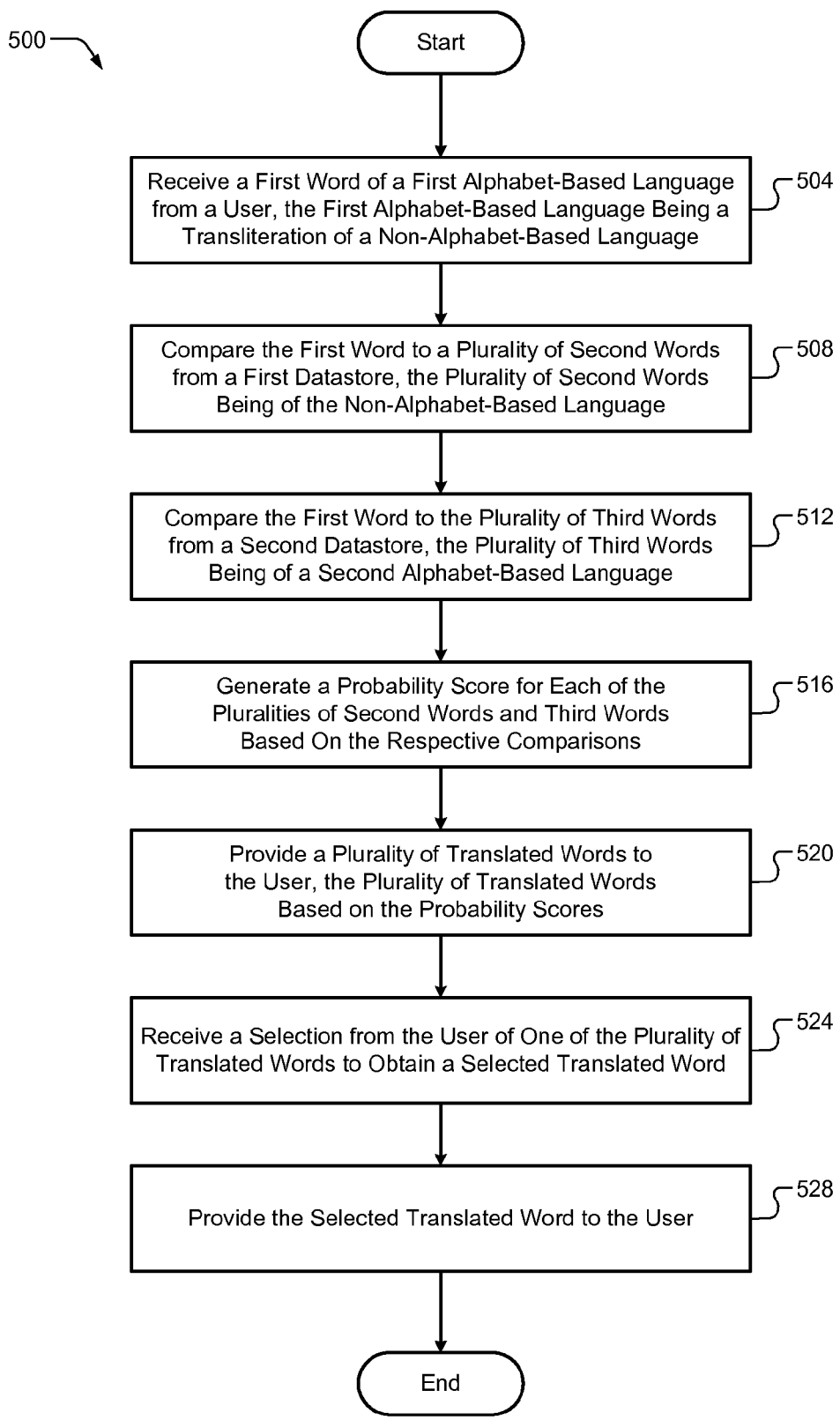
FIG. 5 is a flow diagram of an example technique for assisting a user in the textual input of names of entities to a user device in multiple different languages according to some implementations of the present disclosure.

Referring now to FIG. 5, an example of a technique 500 for assisting a user in the textual input of names of entities to a user device in multiple different languages begins at 504. At 504, the input control module 300 receives first input from the user 108 of the user device 100, the first input including a first word of a first alphabet-based language. The first alphabet-based language is a transliteration of a non-alphabet-based language, and the non-alphabet-based language is one of a logogram-based language and a syllabogram-based language. At 508, the translation module 304 compares the first word to a plurality of second words from the first language datastore 308. The plurality of second words is of the non-alphabet-based language, and the plurality of second words includes potential translations of the first word.

At 512, the translation module 304 compares the first word to a plurality of third words from the second language datastore 312. The plurality of third words is of a second alphabet-based language. The second alphabet-based language is different than the first alphabet-based language. The third plurality of words includes potential translations of the first word. At 516, the translation module 304 generates a probability score for each of the plurality of second words and the plurality of third words based on the respective comparisons to the first word. Each probability score indicates a likelihood that one of the plurality of second words and the plurality of third words is an approved translation of the first word.

At 520, the input control module 300 provides a plurality of translated words to the user 108 via the touch display 104 of the user device 100, the plurality of translated words based on the plurality of second words, the plurality of third words, and the probability scores. At 524, the input control module 300 receives second input from the user 108, the second input indicating a selection of one of the plurality of translated words to obtain a selected translated word. At 528, the input control module 300 provides the selected translated word to the user 108 via the touch display 104 of the user device 100. The technique 500 may then end or return to 504 for one or more additional cycles.

Figure 6:
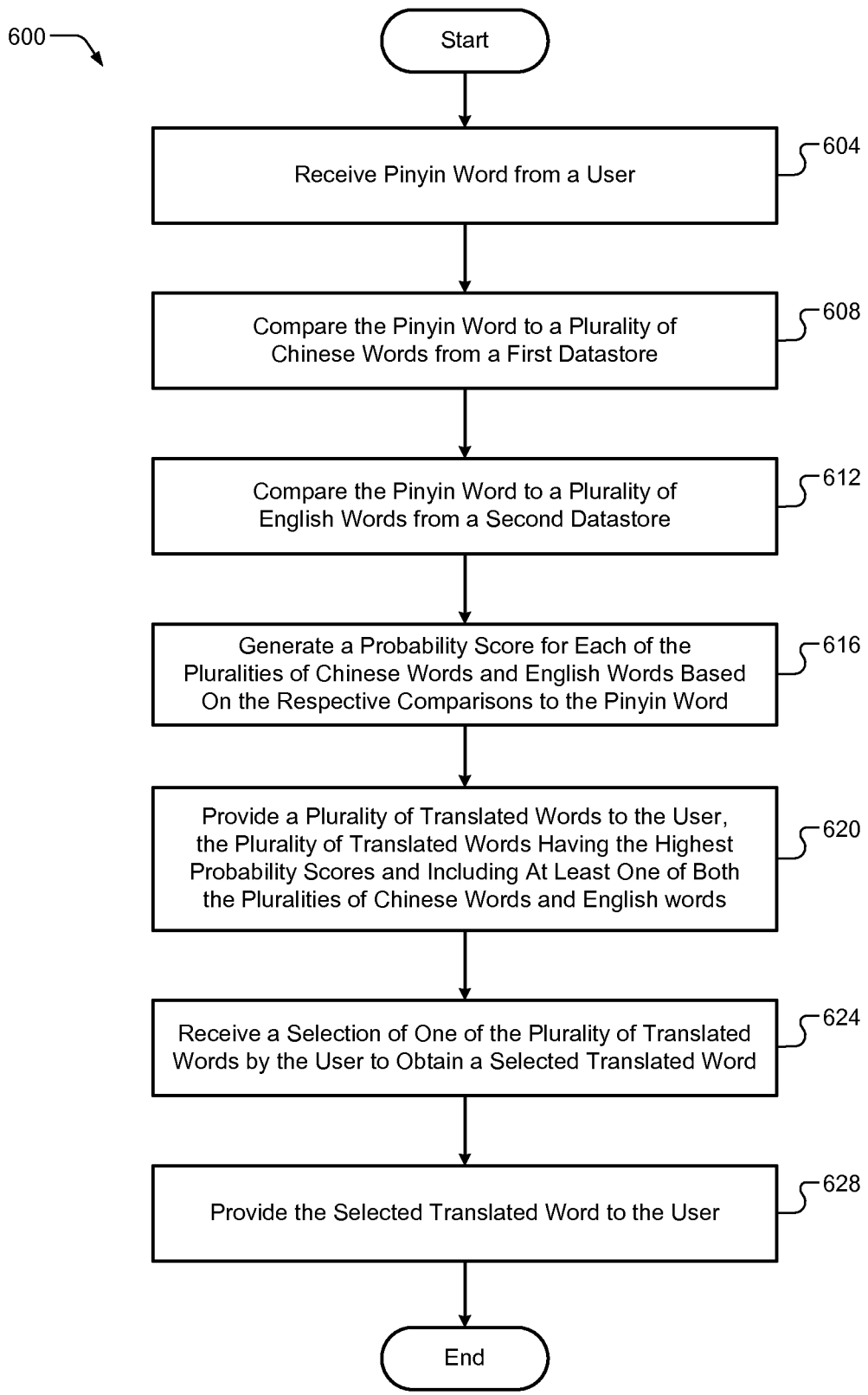
FIG. 6 is a flow diagram of an example technique for assisting a user in the textual input of names of entities to a user device in English and Chinese using Pinyin input according to some implementations of the present disclosure.

Referring now to FIG. 6, an example of a technique 600 for assisting a user in the textual input of English and Chinese names of entities to a user device using Pinyin input begins at 604. At 604, the input control module 300 receives first input from the user 108 of the user device 100, the first input including a Pinyin word, the Pinyin word representing a name of an entity. At 608, the translation module 304 compares the Pinyin word to a plurality of Chinese words from the first language datastore 308, the plurality of Chinese words being translations of the Pinyin word, each of the plurality of Chinese words including one or more Chinese characters.

At 612, the translation module 304 compares the Pinyin word to a plurality of English words from the second language datastore 312, the plurality of English words being translations of the Pinyin word. At 616, the translation module 304 generates a probability score for each of the plurality of Chinese words and the plurality of English words based on the respective comparisons to the Pinyin word, each probability score indicating a likelihood that one of the plurality of Chinese words and the plurality of English words is an approved translation of the Pinyin word.

At 620, the input control module 300 provides a plurality of translated words to the user 108 via the touch display 104 of the user device 100, the plurality of translated words having the highest probability scores, and the plurality of translated words including at least one of the plurality of Chinese words and at least one of the plurality of English words. At 624, the input control module 300 receives a selection of one of the plurality of translated words by the user 108 to obtain a selected translated word. At 628, the input control module 300 provides the selected translated word to the user 108 via the touch display 104 of the user device 100. The technique 600 may then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, via a user interface of a user device further including a display, and a processor, a first input from a user of the user device, the first input including a Pinyin word, the Pinyin word representing a name of an entity;
comparing, at the user device, the Pinyin word to a plurality of Chinese words from a first datastore, the plurality of Chinese words being potential translations of the Pinyin word, each of the plurality of Chinese words including one or more Chinese characters;
comparing, at the user device, the Pinyin word to a plurality of English words from a second datastore, the plurality of English words being potential translations of the Pinyin word;
generating, at the user device, a probability score for each of the plurality of Chinese words and the plurality of English words based on the respective comparisons to the Pinyin word, each probability score indicating a likelihood that a corresponding one of the plurality of Chinese words and the plurality of English words is an appropriate translation of the Pinyin word;
providing, via the display of the user device, a plurality of translated words to the user, the plurality of translated words having the highest probability scores and including at least one of the plurality of Chinese words and at least one of the plurality of English words;
receiving, via the user interface of the user device, a selection of one of the plurality of translated words by the user to obtain a selected word; and
displaying, via the display of the user device, the selected word.

2. A computer-implemented method, comprising:
receiving, via a user interface of a user device further including a display, and a processor, a first input from a user of the user device, the first input including a first word of a first alphabet-based language, the first alphabet-based language being a transliteration of a non-alphabet-based language, the non-alphabet-based language being one of a logogram-based language and a syllabogram-based language;
comparing, at the user device, the first word to a plurality of second words from a first datastore, the plurality of second words being of the non-alphabet-based language, the plurality of second words being potential translations of the first word;
comparing, at the user device, the first word to a plurality of third words from a second datastore, the plurality of third words being of a second alphabet-based language, the second alphabet-based language being different than the first alphabet-based language, the third plurality of words being potential translations of the first word;
generating, at the user device, a probability score for each of the plurality of second words and the plurality of third words based on the respective comparisons to the first word using a language model, each probability score indicating a likelihood that one of the plurality of second words and the plurality of third words is an appropriate translation of the first word;
providing, via the display of the user device, a plurality of translated words to the user, the plurality of translated words based on the plurality of second words, the plurality of third words, and the probability scores;
receiving, via the user interface of the user device, second input from the user, the second input indicating a selection of one of the plurality of translated words to obtain a selected word; and
displaying, via the display of the user device, the selected word.

3. The computer-implemented method of claim 2, wherein the first word is a name of an entity.

4. The computer-implemented method of claim 3, wherein the entity is a person, a place, or an organization.

5. The computer-implemented method of claim 3, wherein the plurality of translated words includes at least one of the plurality of second words and at least one of the plurality of third words.

6. The computer-implemented method of claim 5, further comprising ranking the plurality of second words and the plurality of third words based on their corresponding probability scores to obtain a ranked plurality of translated words.

7. The computer-implemented method of claim 6, further comprising generating the plurality of translated words by selecting a subset of the ranked plurality of translated words.

8. The computer-implemented method of claim 7, wherein the subset of the ranked plurality of translated words is selected based on the probability scores, the plurality of translated words being ones of the plurality of translated words having higher probability scores than a remainder of the plurality of translated words.

9. The computer-implemented method of claim 8, wherein the plurality of translated words includes a predetermined number of translated words, the predetermined number being based on an appropriate number of translated words to view via the display of the user device.

10. The computer-implemented method of claim 9, wherein the predetermined number is based on a type of the user device.

11. The computer-implemented method of claim 2, further comprising at least one of (i) providing the selected word to the processor for processing, and (ii) providing the selected word to a communication module of the user device for communication via a network to another user device or to a server.

12. A system, comprising:
an input control module that receives, via a user interface of a user device further including a display, and a processor, a first input from a user of the user device, the first input including a first word of a first alphabet-based language, the first alphabet-based language being a transliteration of a non-alphabet-based language, the non-alphabet-based language being one of a logogram-based language and a syllabogram-based language;
a comparison module that
(i) compares, at the user device, the first word to a plurality of second words from a first datastore, the plurality of second words being of the non-alphabet-based language, the plurality of second words being potential translations of the first word, and
(ii) compares, at the user device, the first word to a plurality of third words from a second datastore, the plurality of third words being of a second alphabet-based language, the second alphabet-based language being different than the first alphabet-based language, the third plurality of words being potential translations of the first word; and
a scoring module that generates, at the user device, a probability score for each of the plurality of second words and the plurality of third words based on the respective comparisons to the first word using a language model, each probability score indicating a likelihood that one of the plurality of second words and the plurality of third words is an appropriate translation of the first word,
wherein the input control module also
(i) provides, via the display of the user device, a plurality of translated words to the user, the plurality of translated words based on the plurality of second words, the plurality of third words, and the probability scores,
(ii) receives, via the user interface of the user device, second input from the user, the second input indicating a selection of one of the plurality of translated words to obtain a selected word, and
(iii) displays, via the display of the user device, the selected word.

13. The system of claim 12, wherein the first word is a name of an entity.

14. The system of claim 13, wherein the entity is a person, a place, or an organization.

15. The system of claim 13, wherein the plurality of translated words includes at least one of the plurality of second words and at least one of the plurality of third words.

16. The system of claim 15, further comprising a ranking module that ranks the plurality of second words and the plurality of third words based on their corresponding probability scores to obtain a ranked plurality of translated words.

17. The system of claim 16, wherein the input control module generates the plurality of translated words by selecting a subset of the ranked plurality of translated words.

18. The system of claim 17, wherein the subset of the ranked plurality of translated words is selected based on the probability scores, the plurality of translated words being ones of the plurality of translated words having higher probability scores than a remainder of the plurality of translated words.

19. The system of claim 18, wherein the plurality of translated words includes a predetermined number of translated words, the predetermined number being based on an appropriate number of translated words to view via the display of the user device.

20. The system of claim 12, wherein the comparison module at least one of (i) provides the selected word to the processor for processing, and (ii) provides the selected word to a communication module of the user device for communication via a network to another user device or to a server.

* * * * *